US009008972B2

(12) United States Patent
Imhof et al.

(10) Patent No.: US 9,008,972 B2
(45) Date of Patent: Apr. 14, 2015

(54) METHOD FOR SEISMIC INTERPRETATION USING SEISMIC TEXTURE ATTRIBUTES

(75) Inventors: Matthias Imhof, Katy, TX (US); Peng Xu, Annandale, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 169 days.

(21) Appl. No.: 13/378,018

(22) PCT Filed: May 4, 2010

(86) PCT No.: PCT/US2010/033555
§ 371 (c)(1),
(2), (4) Date: Dec. 13, 2011

(87) PCT Pub. No.: WO2011/005353
PCT Pub. Date: Jan. 13, 2011

(65) Prior Publication Data
US 2012/0090834 A1 Apr. 19, 2012

Related U.S. Application Data

(60) Provisional application No. 61/223,243, filed on Jul. 6, 2009, provisional application No. 61/320,929, filed on Apr. 5, 2010.

(51) Int. Cl.
G01V 1/28 (2006.01)
G06K 9/00 (2006.01)
G01V 1/32 (2006.01)

(52) U.S. Cl.
CPC ........ *G06K 9/00536* (2013.01); *G01V 2210/44* (2013.01); *G01V 1/32* (2013.01); *G01V 2210/43* (2013.01)

(58) Field of Classification Search
CPC ........... E21B 47/00; E21B 49/00; G01V 1/28; G01V 1/32; G01V 1/325; G01V 2210/43; G01V 2210/44; G01V 1/302; G01V 2210/677

USPC ............. 702/6, 7, 8, 9, 10, 11, 12, 13; 703/10
See application file for complete search history.

(56) References Cited

U.S. PATENT DOCUMENTS

| 4,916,615 A | 4/1990 | Chittineni |
| 4,992,995 A | 2/1991 | Favret |

(Continued)

FOREIGN PATENT DOCUMENTS

| WO | WO 99/64896 | 12/1999 |
| WO | WO 01/84462 | 11/2001 |

(Continued)

OTHER PUBLICATIONS

Fernandez, A. et al. (2000), "Texture Segmentation of a 3D Seismic Section with Wavelet Transform and Gabor Filters", 15$^{th}$ Int'l. Conf. on Pattein Recognition, pp. 354-357.

(Continued)

*Primary Examiner* — John Breene
*Assistant Examiner* — Timothy H Hwang
(74) *Attorney, Agent, or Firm* — ExxonMobil Upstream Research Company Law Dept.

(57) ABSTRACT

Method for generating a new family of seismic attributes sensitive to seismic texture that can be used for classification and grouping of seismic data into seismically similar regions. A 2D or 3D data analysis window size is selected (23), and for each of multiple positions (25) of the analysis window in the seismic data volume, the data within the window are transformed to a wavenumber domain spectrum (26). At least one attribute of the seismic data is then defined based on one or more spectral properties, and the attribute is computed (28) for each window, generating a multidimensional spectral attribute data volume (29). The attribute data volume can be used for inferring hydrocarbon potential, preferably after classifying the data volume cells based on the computed attribute, partitioning the cells into regions based on the classification, and prioritizing of the regions within a classification.

19 Claims, 12 Drawing Sheets

(56) References Cited

U.S. PATENT DOCUMENTS

| | | | |
|---|---|---|---|
| 5,047,991 A | 9/1991 | Hsu | |
| 5,265,192 A | 11/1993 | McCormack | |
| 5,274,714 A | 12/1993 | Hutcheson et al. | |
| 5,416,750 A | 5/1995 | Doyen et al. | |
| 5,444,619 A | 8/1995 | Hoskins et al. | |
| 5,465,308 A | 11/1995 | Hutcheson et al. | |
| 5,539,704 A | 7/1996 | Doyen et al. | |
| 5,586,082 A | 12/1996 | Anderson et al. | |
| 5,724,309 A * | 3/1998 | Higgs et al. | 367/48 |
| 5,850,622 A | 12/1998 | Vassiliou et al. | |
| 5,852,588 A | 12/1998 | de Hoop et al. | |
| 5,940,777 A | 8/1999 | Keskes | |
| 5,940,778 A | 8/1999 | Marfurt et al. | |
| 6,016,462 A | 1/2000 | Schneider, Jr. et al. | |
| 6,052,650 A | 4/2000 | Assa et al. | |
| 6,131,070 A * | 10/2000 | Ferber | 702/14 |
| 6,131,071 A * | 10/2000 | Partyka et al. | 702/16 |
| 6,226,596 B1 | 5/2001 | Gao | |
| 6,236,942 B1 | 5/2001 | Bush | |
| 6,278,949 B1 | 8/2001 | Alam | |
| 6,295,504 B1 | 9/2001 | Ye et al. | |
| 6,363,327 B1 | 3/2002 | Wallet et al. | |
| 6,411,903 B2 | 6/2002 | Bush | |
| 6,438,493 B1 | 8/2002 | West et al. | |
| 6,466,923 B1 | 10/2002 | Young | |
| 6,473,696 B1 | 10/2002 | Onyia et al. | |
| 6,516,274 B2 | 2/2003 | Cheng et al. | |
| 6,574,566 B2 | 6/2003 | Grismore et al. | |
| 6,594,585 B1 * | 7/2003 | Gersztenkorn | 702/14 |
| 6,618,678 B1 | 9/2003 | Van Riel | |
| 6,625,541 B1 | 9/2003 | Shenoy et al. | |
| 6,628,806 B1 | 9/2003 | Keskes et al. | |
| 6,725,163 B1 | 4/2004 | Trappe et al. | |
| 6,735,526 B1 | 5/2004 | Meldahl et al. | |
| 6,745,129 B1 | 6/2004 | Li et al. | |
| 6,757,614 B2 | 6/2004 | Pepper et al. | |
| 6,782,124 B2 * | 8/2004 | Gloersen | 382/154 |
| 6,804,609 B1 | 10/2004 | Brumbaugh | |
| 6,847,895 B2 | 1/2005 | Nivlet et al. | |
| 6,950,786 B1 * | 9/2005 | Sonneland et al. | 703/2 |
| 6,957,146 B1 | 10/2005 | Taner et al. | |
| 6,970,397 B2 | 11/2005 | Castagna et al. | |
| 6,988,038 B2 | 1/2006 | Trappe et al. | |
| 7,162,463 B1 | 1/2007 | Wentland et al. | |
| 7,184,991 B1 | 2/2007 | Wentland et al. | |
| 7,188,092 B2 | 3/2007 | Wentland et al. | |
| 7,197,444 B2 | 3/2007 | Bomar, Jr. et al. | |
| 7,222,023 B2 | 5/2007 | Laurent et al. | |
| 7,243,029 B2 | 7/2007 | Lichman et al. | |
| 7,248,258 B2 | 7/2007 | Acosta et al. | |
| 7,248,539 B2 | 7/2007 | Borgos et al. | |
| 7,295,706 B2 | 11/2007 | Wentland et al. | |
| 7,295,930 B2 | 11/2007 | Dulac et al. | |
| 7,308,139 B2 | 12/2007 | Wentland et al. | |
| 7,389,158 B2 | 6/2008 | Desrochers et al. | |
| 7,453,767 B1 | 11/2008 | Padgett | |
| 7,463,552 B1 | 12/2008 | Padgett | |
| 7,584,057 B2 * | 9/2009 | Ozbek et al. | 702/17 |
| 7,953,675 B2 | 5/2011 | Medioni et al. | |
| 8,027,517 B2 | 9/2011 | Gauthier et al. | |
| 2003/0231548 A1 | 12/2003 | Gillard et al. | |
| 2005/0171700 A1 | 8/2005 | Dean | |
| 2005/0273265 A1 | 12/2005 | Ren | |
| 2005/0288863 A1 | 12/2005 | Workman | |
| 2006/0116145 A1 | 6/2006 | Hunzinger | |
| 2006/0122780 A1 * | 6/2006 | Cohen et al. | 702/14 |
| 2006/0184488 A1 | 8/2006 | Wentland | |
| 2007/0223788 A1 | 9/2007 | Pinnegar et al. | |
| 2009/0005996 A1 * | 1/2009 | Delorme et al. | 702/12 |
| 2009/0043507 A1 * | 2/2009 | Dommisse et al. | 702/6 |
| 2009/0292475 A1 * | 11/2009 | Alam et al. | 702/14 |
| 2010/0270026 A1 * | 10/2010 | Lazaratos et al. | 166/369 |

FOREIGN PATENT DOCUMENTS

| | | |
|---|---|---|
| WO | WO 01/96905 | 12/2001 |
| WO | WO 2008/130978 | 10/2008 |
| WO | WO 2009/011735 | 1/2009 |

OTHER PUBLICATIONS

Fernandez-Martinez. J.L. et al. (2009), "GenLab: A MATLAB-based program for structural analysis of folds mapped by GPS or seismic methods", Computers & Geosciences 35, pp. 317-326.

Frigo, M. et al. (2005), "The Design and Implementation of FFTW3", Proceedings of IEEE 93, pp. 216-231.

Harris, F.J. (1978), "On the use of Windows for Harmonic Analysis with the Discrete Fourier Transform", Proceedings of IEEE 55, pp. 51-83.

Patel, D. et al. (2008), "The Seismic Analyzer: Interpreting and Illustrating 2D Seismic Data", IEEE Transactions on Visualization and Computer Graphics 14, pp. 1571-1578.

Pitas, I., et al. (1989), "Texture Analysis and Segmentation of Seismic Images", Int'l. Conf. on Acoustics, Speech, and Signal Processing, pp. 1437-1440.

Randen, T. et al. (2005), "Atlas of 3D Seismic Attributes", Mathematical Methods and Modeling in Hydrocarbon Exploration and Production, pp. 23-46.

Simaan, M.A. (1991), "Knowledge-Based Computer System for Segmentation of Seismic Sections Based on Texture", SEG Expanded Abstracts 10, pp. 289-292.

Winograd, S. (1978), "On computing the discrete Fourier transform", Mat. Computation 32, pp. 175-199.

*International Search Report and Written Opinion*, dated Jul. 20, 2010, PCT/US2010/33555.

Zhang, T. (2009), "Coherence-derived Volumetric Curvature Using the Windowed Fourier Transform", 71$^{st}$ EAGE Conf. & Exh., 6 pgs.

* cited by examiner

METHOD FOR SEISMIC INTERPRETATION USING SEISMIC TEXTURE ATTRIBUTES

CROSS REFERENCE TO RELATED APPLICATION

This application is the National Stage entry under 35 U.S.C. 371 of PCT/US2010/033555 that published as WO 2011/005353 and was filed on 4 May 2010, which claims the benefit of U.S. Provisional Application No. 61/223,243, filed on 6 Jul. 2009 and U.S. Provisional Application No. 61/320,929, filed 5 Apr. 2010, which is incorporated by reference, in its entirety, for all purposes.

FIELD OF THE INVENTION

This invention relates generally to the field of geophysical prospecting, and more particularly to the analysis of seismic data. Specifically, the invention is a method to create and use seismic attributes sensitive to seismic texture, which invention identifies and prioritizes geological or geophysical features pertinent to hydrocarbon exploration and production.

BACKGROUND OF THE INVENTION

A seismic attribute is a measurable property of seismic data used to highlight or identify geological or geophysical features. Sets of attributes are further useful either for supervised or unsupervised classification to partition the data into distinct regions, or for data mining to find regions compatible with a prescribed pattern. Such classification can easily create hundreds of regions and an automated process of ranking the regions allows the interpreter to focus on the more promising ones. A partial review of published use of seismic attributes follows.

U.S. Pat. No. 5,850,622 ("Time-Frequency Processing and Analysis of Seismic Data Using Very Short-Time Fourier Transforms") to Vassiliou and Garossino discloses a method of removing or attenuating seismic noise that can also be used for seismic attribute analysis and automatic trace editing. The method applies a Very Short-Time Fourier Transform (VSTFT) to replicate one broadband trace into many near single-frequency "sub-band" traces.

U.S. Pat. No. 5,940,778 ("Method Of Seismic Attribute Generation And Seismic Exploration") to Marfurt et al. discloses methods of quantifying and visualizing structural and stratigraphic features in three dimensions through the use of eigenvector and eigenvalue analyses of a similarity matrix. It further discloses the use of seismic attributes derived from similarity matrices to detect the conditions favorable for the origination, migration, accumulation, and presence of hydrocarbons in the subsurface.

U.S. Pat. No. 6,226,596 ("Method For Analyzing And Classifying Three Dimensional Seismic Information") to Gao discloses a method to capture and characterize three dimensional seismic reflection patterns based volume-seismic textures valuated using a Voxel Coupling Matrix (VCM). To extract the VCM seismic textural information at a specific location, a finite number of neighboring voxels are processed to create the VCM. The VCM is then processed to create to texture attributes. Such attribute volumes are subsequently used classified to produce a seismic interpretation volume.

U.S. Pat. No. 6,278,949 ("Method For Multi-Attribute Identification Of Structure And Stratigraphy In A Volume Of Seismic Data") to Alam discloses a method for the visual exploration of a seismic volume without horizon picking or editing, but that still displays all horizons with their stratigraphic features and lithologic variations. Seismic data are processed to generate multiple attributes at each event location with a specified phase of the seismic trace. Subsets of multiple attributes are then interactively selected, thresholded, and combined with a mathematical operator into a new volume displayed on a computer workstation. Manipulation of attribute volumes and operators allows the user to recognize visually bodies of potential hydrocarbon reservoirs.

U.S. Pat. No. 6,438,493 ("Method For Seismic Facies Interpretation Using Textural Analysis And Neural Networks") to West and May discloses a method for segmentation based on seismic texture classification. For a prescribed set of seismic facies in seismic data volume, textural attributes are calculated and used to train a probabilistic neural network. This neural network is then used to classify each voxel of the data, which in practice segments the data into the different classes. Further, U.S. Pat. No. 6,560,540 ("Method For Mapping Seismic Attributes Using Neural Networks") to West and May discloses a method for classification of seismic data during the seismic facies mapping process.

U.S. Pat. No. 6,594,585 ("Method Of Frequency Domain Seismic Attribute Generation") to Gerszetenkorn discloses a method of generating attributes from seismic data. The central idea is that the amplitude or phase spectrum of a short-window Fourier transform is fit with a model curve whose parameters are used as seismic attributes.

U.S. Pat. No. 6,628,806 ("Method For Detecting Chaotic Structures in a Given Medium") to Keskes and Pauget discloses a method of detecting chaotic structures in seismic data based on the variability of the gradient vectors, or to be more specific, the eigenvalues computed from a local sum of dyadic gradient-vector products.

U.S. Pat. No. 6,745,129 ("Wavelet-Based Analysis of Singularities in Seismic Data") to Li and Liner discloses a wavelet-based method for the analysis of singularities of seismic data. A wavelet transform is applied to seismic data and the Holder exponent is calculated for every time point of the wavelet transform. The Holder exponents plotted versus time are utilized in place of seismic traces for visualization because they appear to highlight stratigraphic boundaries and other geological features.

U.S. Pat. No. 7,398,158 ("Method and Apparatus for Detecting Fractures Using Frequency Data Derived from Seismic Data") to Najmuddin discloses a method to map fractures in an Earth formation. This method uses the frequency spectra derived from P-wave seismic data over a pair of specific time windows above and below a seismic horizon to infer the presence or absence of fractures based on the attenuation of high frequencies as measured by the shift in frequency spectra from higher frequencies to lower ones.

U.S. Patent Application No. 2007/0223788 ("Local Dominant Wave-Vector Analysis of Seismic Data") by Pinnegar et al. discloses a method for processing multi-dimensional data to determine frequency-dependent features therein. The multi-dimensional signal data are transformed into space-frequency or time-space-frequency domain using either a Full Polar S-Transform (FPST) or Sparse Polar S-Transform (SPST) to determine the dominant component and its orientation, which allows generation of a dip map, a frequency map, or an amplitude map.

PCT Patent Application Publication No. WO 2008/130978 ("Methods of Hydrocarbon Detection Using Spectral Energy Analysis") by Wiley et al. discloses a method for detecting hydrocarbons based on the dominant frequency and bandwidth at and near the target area.

PCT Patent Application Publication No. WO 2009/011735 ("Geologic Features from Curvelet Based Seismic Attributes") by Neelamani and Converse discloses a method for identifying geologic features from seismic data by taking a curvelet transform of the data. From this curvelet representation, selected geophysical data attributes and their interdependencies are extracted that are used to identify geologic features.

Pitas and Kotropoulos ("Texture Analysis and Segmentation of Seismic Images", International Conference on Acoustics, Speech, and Signal Processing, 1437-1440 (1989)) propose a method for the texture analysis and segmentation of geophysical data based on the detection of seismic horizons and the calculation of their attributes (e.g. length, average reflection strength, signature). These attributes represent the texture of the seismic image. The surfaces are clustered into classes according to these attributes. Each cluster represents a distinct texture characteristic of the seismic image. After this initial clustering, the points of each surface are used as seeds for segmentation where all pixels in the seismic image are clustered in those classes in accordance to their geometric proximity to the classified surfaces.

Simaan (e.g., "Knowledge-Based Computer System for Segmentation of Seismic Sections Based on Texture", *SEG Expanded Abstracts* 10, 289-292 (1991)) disclose a method for the segmentation of two-dimensional seismic sections based on the seismic texture and heuristic geologic rules.

Fernandez et al. ("Texture Segmentation of a 3D Seismic Section with Wavelet Transform and Gabor Filters", $15^{th}$ International Conference on Pattern Recognition, 354-357 (2000)) describe a supervised segmentation (i.e., classification) of a 3D seismic section that is carried out using wavelet transforms. Attributes are computed on the wavelet expansion and on the wavelet-filtered signal, and used by a classifier to recognize and subsequently segment the seismic section. The filters are designed by optimizing the classification of geologically well understood zones. As a result of the segmentation, zones of different internal stratification are identified in the seismic section by comparison with the reference patterns extracted from the representative areas.

Patel et al., ("The Seismic Analyzer: Interpreting and Illustrating 2D Seismic Data", *IEEE Transactions on Visualization and Computer Graphics* 14, 1571-1578 (2008)) disclose a toolbox for the interpretation and illustration of two-dimensional seismic slices. The method precalculates the horizon structures in the seismic data and annotates them by applying illustrative rendering algorithms such as deformed texturing and line and texture transfer functions.

Randen and Sonneland ("Atlas of 3D Seismic Attributes", in *Mathematical Methods and Modeling in Hydrocarbon Exploration and Production*, Iske and Randen (editors), Springer, 23-46 (2005)) present an overview of three-dimensional seismic attributes that characterize seismic texture or seismostratigraphic features.

In "Coherence-derived volumetric curvature using the Windowed Fourier Transform," Zhang performs the windowed Fourier transform in 1D using a 1D window to obtain a volumetric curvature attribute, which gives improved ability to identify geologic structure, faults and fractures. ($71^{st}$ EAGE Conference, Amsterdam, The Netherlands, Jun. 8-11, 2009, paper 275)

What is needed is a method that distinguishes different regions of the seismic data based on their seismic texture, preferably partitions the data into the different regions in an automated manner, and ideally even ranks the regions based on their potential to contain hydrocarbons. The present invention satisfies this need

SUMMARY OF THE INVENTION

In one embodiment, the invention is a method for transforming a seismic survey data volume into a seismic attribute data volume more sensitive to subsurface geophysical features indicative of hydrocarbon potential, comprising:

(a) selecting a 2D or 3D data analysis window size;

(b) for each of multiple positions of the analysis window in the seismic data volume, transforming the data within the window to a spectrum in a wavenumber domain; and (c) defining an attribute of the seismic data based on one or more spectral properties ("spectral attribute"), and computing the spectral attribute for each window, and assigning that attribute value to a spatial location representative of the window, thereby creating a multidimensional spectral attribute data volume.

In some embodiments of the invention, the spectral attribute is defined in terms of a selected measure of at least two transformed data values within the analysis window. Preferred transforms for the present invention are the Fourier, Bessel and Hankel transforms, and particularly a multidimensional Discrete Fourier Transform.

BRIEF DESCRIPTION OF THE DRAWINGS

The present invention and its advantages will be better understood by referring to the following detailed description and the attached drawings in which.

Figure 1:
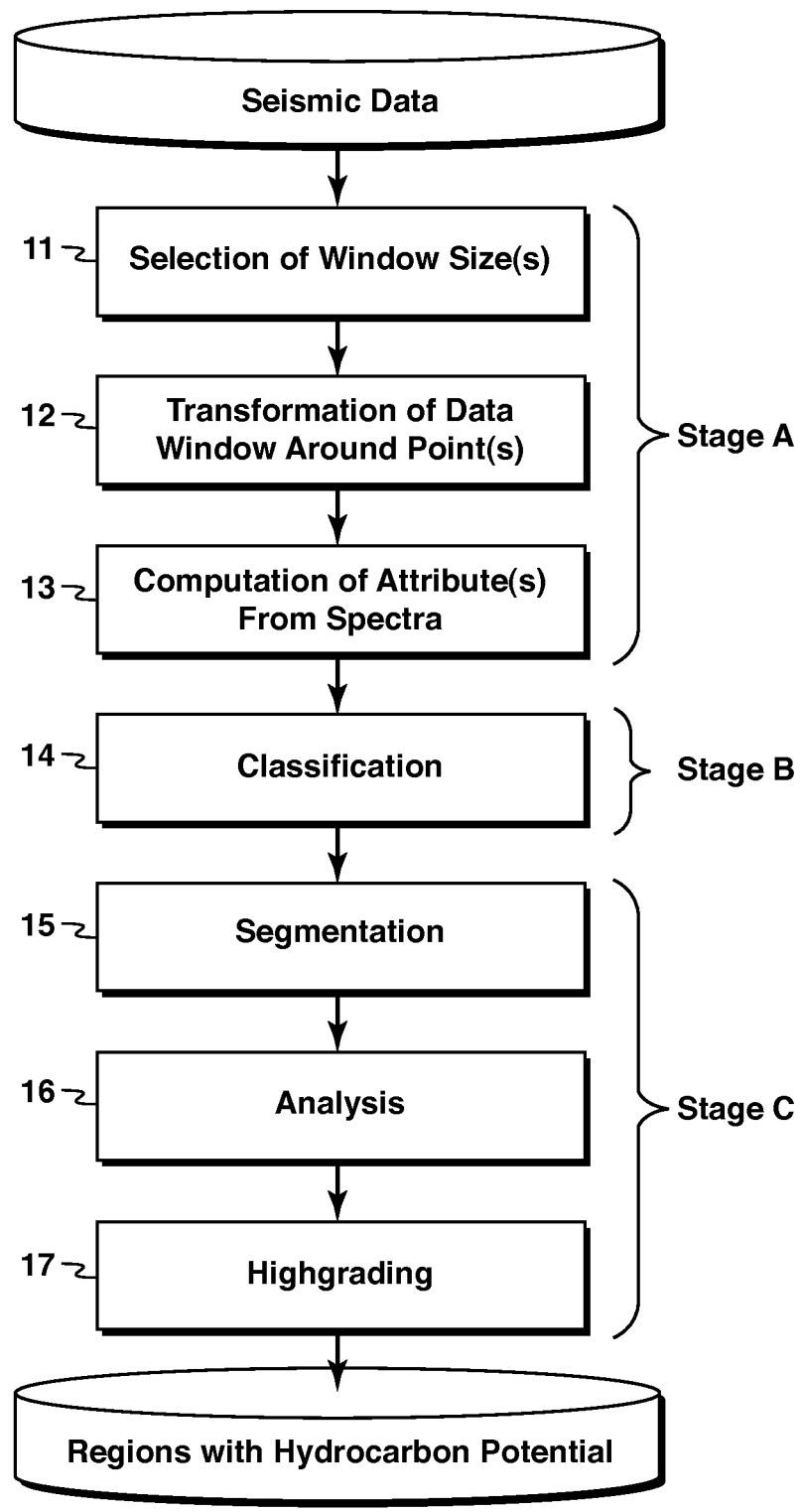
FIG. 1 is a flow chart illustrating seismic classification and evaluation based on multidimensional spectral attributes.

The invention will be described in connection with example embodiments. To the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

In order to search for hydrocarbon accumulations in the earth, geoscientists use methods of remote sensing to look below the earth's surface. In the routinely used seismic reflection method, man-made sound waves are generated near the surface. The sound propagates into the earth, and whenever the sound passes from one rock layer into another, a small portion of the sound reflects back to the surface where it is recorded. Typically, hundreds to thousands recording instruments are employed. Sound waves are sequentially excited at many different locations. From all these recordings, a two- or three-dimensional image of the subsurface is obtained after significant data processing.

From these images, one can extract seismic attributes, which word is used herein in its term of art meaning, i.e. properties measurable from the seismic data that are useful for describing the seismic data. Example attributes include time, amplitude, or frequency. Generally, time-based measurements relate to structure, amplitude-based ones to stratigraphy and reservoir characterization, and frequency-based ones to stratigraphy and reservoir characterization. Because there are many ways to arrange data, attributes constitute an open set, and because they are based on a limited number of measurements, attributes are generally not independent. Attributes are useful to the extent that they correlate with some physical property of interest and help to see features, relationships, and patterns that otherwise might go unnoticed. Such attributes represent a transformation of seismic data to a form more useful in interpreting the existence of physical objects with hydrocarbon significance.

A primary application of attributes is therefore to aid seismic interpretation by direct visualization because they highlight or identify geological or geophysical features. Furthermore, seismic attributes can be used to segment or partition the data into geobodies or regions defined by similar seismic attributes. The nucleus of the present inventive method is a new family of seismic attributes sensitive to texture of the seismic data display, and a method for their computation. All embodiments are described for the application to three-dimensional data volumes. Other cases, for two-dimensional data sections, follow by analogy. The new attributes are computed from local wavenumber-spectra, and may be called window-based multidimensional Fourier attributes or multi-dimensional spectral attributes, where spectral refers to multidimensional wavenumber spectra and not the more common frequency spectra.

The new attributes are well suited to characterize the local texture of the seismic data. Moreover, generation of these attributes is efficient because they may be computed using discrete Fast Fourier Transforms (FFT). The interpreter may use these attributes directly for interpretation and visualization, or may use combinations of these attributes to automatically group and classify the data based on their seismic texture. The interpreter may then directly use the classification volumes by application of conventional interpretation methods that include mapping, visualization, or geobody picking, or may use the computer to partition the data into regions based on this classification, and then to analyze the regions for their hydrocarbon potential, and finally to rank the regions to prioritize subsequent efforts.

FIG. 1 presents a flow chart of a seismic pattern recognition method that generates and uses the attributes of the present invention. It consists of the following steps: (11) selection of one or multiple window sizes, (12) transformation of data windows into the spectral (meaning in this case vector wavenumber) domain, (13) computation of spectral attributes, and (14) attribute-based data classification. Based on the classification, at step 15 the data are partitioned into regions. After this segmentation, there may be multiple regions with the same classification. Step 16 is analysis of these regions, followed by step 17, high grading based on their potential to either contain hydrocarbons or relate to a hydrocarbon system.

While this pattern recognition workflow is fairly traditional, the attributes used, multidimensional windowed Fourier attributes, are not. These attributes require selection of a size for the analysis window. For the same attribute, differently sized windows can generate different results, because the window size determines the scale at which geologic features are sensed. In fact, the results are typically scale dependent. The step of window size selection is explicitly stated to stress the attributes' ability for multi-scale resolution. Because these attributes have applications beyond seismic classification, and classification creates yet another attribute volume, the workflow is split into three stages (A, B and C) that are discussed separately next.

Figure 2:
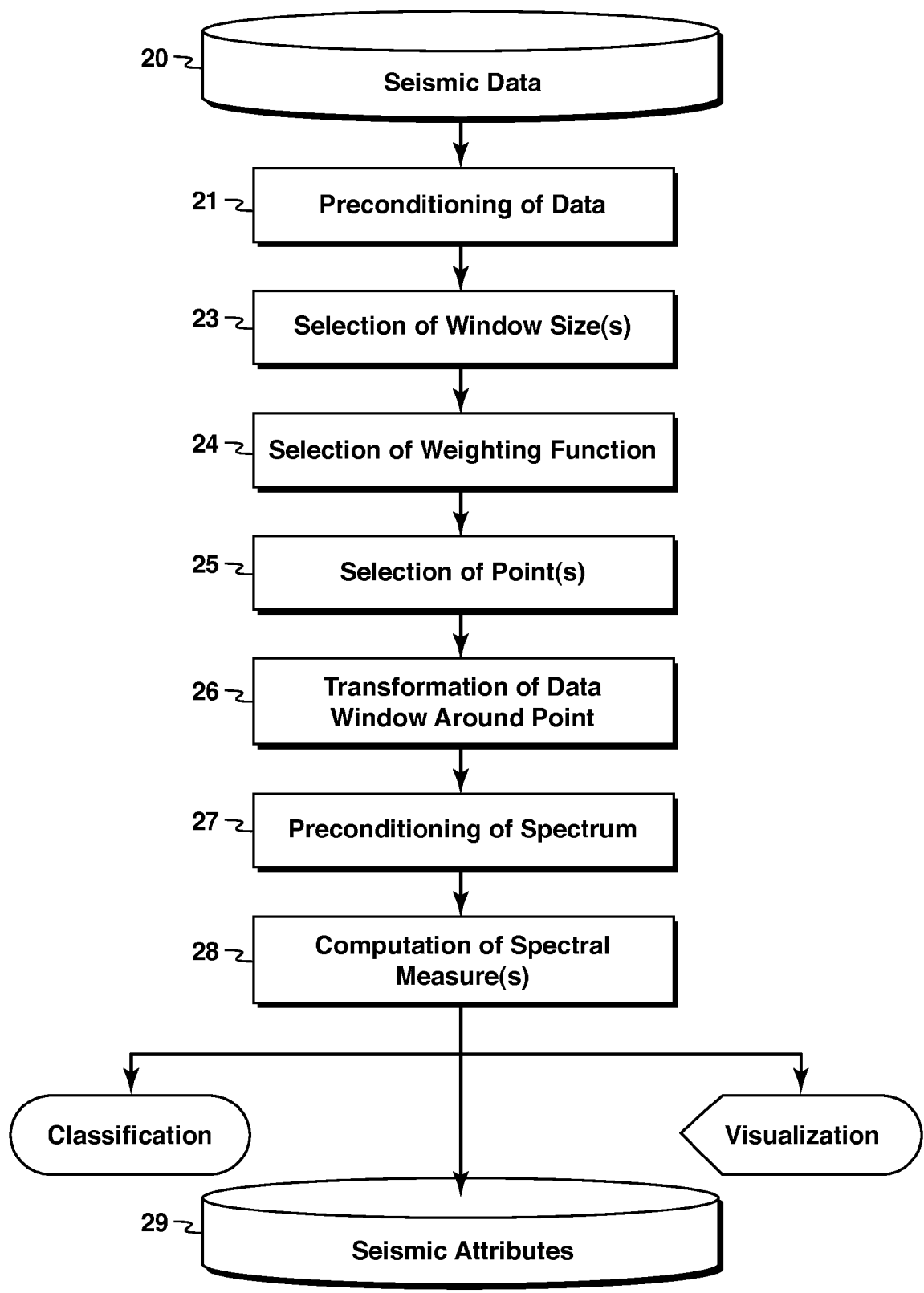
FIG. 2 is a flow chart showing basic steps in Stage A of the inventive method, the generation of multidimensional spectral attributes.

Stage A is the generation of attributes as outlined in the flow chart of FIG. 2, and corresponds to steps 11-13 in FIG. 1, but with the greater detail of a particular embodiment of the invention. The process begins with a seismic data volume 20. Preferentially, the data are a three-dimensional volume of seismic amplitudes, but an attribute of the seismic data can be used instead. Step 21, which is optional, is preconditioning of the seismic data to remove noise, filter the data, or create secondary attribute volumes to be analyzed with the inventive method. For example, a Hilbert transform shifts the phase of the seismic wavelet by 90° to create so-called quadrature data. The original data and the quadrature data can even be combined to form complex-valued analytic data.

Moving to step 23, the three-dimensional analysis window preferably is a rectangular parallelepiped, resembling a little brick, although any shape, for example a sphere or a cylinder could alternatively be used. It should be noted, however, that a particular analysis window in conjunction with an appropriate weighting function (optional step 24) allows approximation of many other shapes of analysis windows. Many transformations (referring now to step 12 of FIG. 1) have a natural domain on which they are defined and most efficient to perform. For the discrete Fourier transform ("DFT") used in a preferred embodiment of the present invention, this domain is the brick which is fortuitous because seismic data are typically discretized into data volumes in which each cell has the shape of a brick.

The window size to be used for the analysis is selected by the user, either manually or through a programmed algorithm. Assuming the brick shape window, this means selecting three numbers: nx, ny and nz. Typical sizes range from 3×3×3 to 81×81×81. There is no requirement that all three dimensions are of the same size, but at least nx and ny are typically chosen to be equal. Selection of the window size is an important step because it allows computation of scale-dependent attributes where the same attribute is computed at the same locations, but with different sizes of analysis windows and thus sensing geologic features at differing scales and resolutions.

Step 24, use of a weighting function, is optional. Accordingly, it may be programmed into an automated version of the invention such that by default, all the coefficients of the weighting function are set to be unity, which renders the weighting an identity operator that leaves the data unchanged. Typically, some weighting, for example to mitigate edge or truncation effects, is recommended. A simple cosine taper may suffice, but other commonly used functions such as Gaussian or Hamming tapers are described in, e.g., Harris, "On the Use of Windows for Harmonic Analysis with the Discrete Fourier Transform," *Proceedings of the IEEE* 66, 51-83 (1978). The user may prefer some other weighting function.

In three dimensions, a cosine filter can be constructed as $$w(x,y,z)=\cos(\pi x/n_x)\cos(\pi y/n_y)\cos(\pi z/n_z).$$

While perfectly workable, the triple multiplication creates a very sharp taper towards the edges and corners. A preferred modification of the cosine filter is $$w(x,y,z)=\max(\cos(\pi x/n_x),\cos(\pi y/n_y),\cos(\pi z/n_z))$$

which exhibits a more gradual taper by avoiding the multiplication of three small numbers.

A particular form of weighting is resampling of the input where the size of the data window is either reduced by subsampling or enlarged by interpolation. Resampling may be performed on a window-by-window basis, or globally by resampling the entire dataset. Interpolation or supersampling is advisable when steep events are present in the data that may be aliased. Subsampling increases computational efficiency when large windows are used because large windows result in longer runtimes. Large windows are particularly sensitive to low frequencies, long wavelengths, or small wavenumbers that are preserved when the data are decimated, subsampled or downsampled. In the case of subsampling, the data should also be filtered with a lowpass filter because subsampling may introduce aliasing artifacts. Thus, weighting may include tapering, filtering, and/or resampling.

The selection of points for the analysis (step 25) is very flexible. The analysis can be performed at one point, for a set of points, for points on an arbitrary curve cutting through the volume, for points on an arbitrary surface cutting through the volume, or for points inside an arbitrary sub-volume inside the volume, just to give a few examples. Preferred modes include performance of the analysis for all points on either an inline section, a crossline section, a time or horizon slice, or the volume itself. It should be understood that in all these cases, the analysis is performed using a multidimensional data window selected in step 23. The differences brought about by the different options in step 25 are only in where the analysis is performed and how often it is repeated spatially.

Windows for neighboring analysis points may share a large portion of their data. For a window of size 11×11×11, windows centered at neighboring locations share 90% of their data. Because large portions of data are common to both points, their multidimensional spectra and the resulting measures or attributes will be similar. For large windows, the analysis is preferably performed at a few, sparse locations and the results are then interpolated in between instead of computing spectra and measures at every data point which corresponds to resampling the output. A practical tradeoff between efficiency and accuracy is overlapping neighboring windows by 80%. For a window of size 49×49×49, the analysis points will then be spaced ten points apart which yields a thousand-fold increase in efficiency without sacrificing details or accuracy. In between analysis points, the results may be interpolated. For sparse analysis points arranged in a regular Cartesian manner, the preferred interpolation in two dimensions is the bilinear interpolation, while the trilinear interpolation is the preferred method in three dimensions. In either method, the data are first interpolated linearly along one dimension, which interpolates point samples to lines, then along a second dimension, which interpolates lines to surfaces, and finally along the third and last dimension, which interpolates surfaces to volumes. Variations of this method may substitute linear interpolation with sinc interpolation or spline interpolation. Independent of the arrangement of the analysis points, results in between analysis points may be estimated by triangulation, nearest-neighbor interpolation, inverse-distance interpolation, or kriging.

The next step (26) is transformation of the multidimensional data window into the spectral (wavenumber) domain. This transformation is performed one window at a time. Potential transformations include the Fourier transform, the Hartley transform, the Hankel transform, the Bessel transform, the Abel transform, the Mellin transform, the Radon transform or one of their many variations. See, for example, Bracewell, *The Fourier Transform and Its Applications*, McGraw-Hill (1986), pages 241-272, or any of many other similar textbooks on applied mathematics. Fourier transforms decompose the data into harmonic plane waves which can be performed very efficiently using the Fast Fourier Transformation (FFT) algorithm (FFT). Variations of the Fourier transform include the Cosine or Sine transforms, or the Hartley transform which have also been implemented very efficiently in a discretized form. The Hankel transform decomposes the data into harmonic cylindrical waves, while the Bessel transform decomposes into harmonic spherical waves.

Preferred embodiments of the present inventive method use one of the Fourier, Bessel and Hankel transforms, although other transforms may be used. A more preferred embodiment uses a multidimensional Discrete Fourier Transform ("DFT"). The Winograd transform is a variation of the DFT algorithm optimized for window sizes that are a product of the factors 2, 3, 4, 5, 7, 8, 11, 13, and 16 (Winograd, "On computing the discrete Fourier transform," *Math. Computation* 32, 175-199, (1978)). There exists an even faster DFT algorithm for window sizes that are products of the factors 2, 3, 5, or 7; see Frigo and Johnson, "The Design and Implementation of FFTW3," *Proceedings of the IEEE* 93, 216-231 (2005). Use of data windows with all dimensions having an odd number of voxels centers the analysis window exactly on one data point or voxel, and may for this reason be considered preferable for using the DFT, or any other transform for that matter.

Fourier transforms take a data window d(x,y,z) and convert it to the following form, where F represents the Fourier transform:

$$D(k,l,m)=F(d(x,y,z))$$

$$D(k,l,m)=A(k,l,m)e^{i\theta(k,l,m)}$$

This particular form is chosen to emphasize that the Fourier decomposition has three components: (1) the amplitude spectrum A, (2) the phase spectrum θ, and (3) orientation (k,l,m) or normalized orientation ($\hat{k},\hat{l},\hat{m}$), where $\hat{k}=k/\sqrt{k^2+l^2+m^2}$ and analogously for $\hat{l}$ and $\hat{m}$. Knowledgeable persons in the technical field of this invention will appreciate that while a traditional one-dimensional Fourier transform finds phase and amplitude for sinusoids of a given frequency, multidimensional Fourier transforms find phase and amplitude for harmonic plane waves that have not only a wavelength but also a direction. Direction (a unit vector) and wavelength can be combined into one vector called wavenumber that takes the place of frequency in multidimensional Fourier transforms. Thus, having measurements on a 3D grid of brick shaped cells provides a directionality property.

Different spectral measures selected at step 28 may employ different combinations of the three components.

In optional step 27, the entire spectrum or any parts of it can be modified for example by filtering, muting, symmetrification, reflection, or an affine transformation. One particular modification is windowing, for example into quadrants or octants. Windowing of the spectrum can be used to compute any measure from only a portion of the spectrum. Preferably, however, at least two windows are selected. For each window, a measure is computed, and a new measure is formed from the comparison of the individual results. The individual results may be added, subtracted, multiplied, divided or combined in any other manner to form at least one measure. The windows may partially overlap, be mutually exclusive, span the entire spectrum, or only a portion thereof. The obvious method of splitting the spectrum into two symmetric halves may not yield a satisfactory result because the multidimensional Fourier spectrum exhibits point symmetry with regard to the origin (or zero wave number). A further generalization is the use of multiple windows where measures from a user-specified window are compared against an extreme one, or measures from extreme windows are compared against each other, for example the sum of the maximum from every window, or the ratio between the two largest window maxima.

Next is step 28, where various measures of the wavenumber spectra that are defined by the present invention may be computed. These measures are the inventive attributes. A first set of attributes that may be generated by the present inventive method treats the amplitude spectrum A as a set of samples without structure. Example measures of this kind include the maximum $A_{max}$ of A, or its minimum $A_{min}$, mean $A_{mean}$, harmonic mean $A_{harmonic}$, median $A_{median}$, mode $A_{mode}$, variance $A_{var}$, standard deviation $A_{std}$, skewness $A_{skew}$, kurtosis $A_{kurt}$, eccentricity $A_{minmax}$, or its anisotropy $A_{aniso}$ defined as the ratio between maximum and mean. Definitions of these example measures (attributes) follow. Regarding $A_{max}$ and $A_{min}$, although these attributes have significance, a single spectral value, such as the dominant amplitude or its associated direction, is a poor measure of seismic texture. Texture results from the local interference of seismic events or, in the case of regular, through-going events, the lack of interference. Thus, analysis of a single event, for example the dominant one only, does not characterize texture. A texture measure as preferred for the present inventive method detects the local presence of multiple events and compares their properties. The present inventive measures analyze the local texture by transformation into a wavenumber domain and characterize texture by combining or comparing the different events contained in the spectra.

$$A_{mean} = \frac{1}{N} \sum_{k,l,m} A(k, l, m)$$

$$A_{harmonic} = \frac{1}{N} \sqrt{\sum_{k,l,m} A(k, l, m)^2}$$

$$A_{var} = \frac{1}{N} \sum_{k,l,m} (A(k, l, m) - A_{mean})^2$$

$$A_{std} = \sqrt{A_{var}}$$

$$A_{skew} = \frac{1}{NA_{var}} \sum_{k,l,m} (A(k, l, m) - A_{mean})^3$$

$$A_{kurt} = \frac{1}{NA_{var}} \sum_{k,l,m} (A(k, l, m) - A_{mean})^4$$

$$A_{minmax} = A_{min} / A_{max}$$

$$A_{aniso} = A_{max} / A_{mean}$$

The factor N is defined as $N = nx \cdot ny \cdot nz$.

A preferred attribute resulting from the present invention is regularity $A_{regularity}$ that measures how banded, and thus how regular, the seismic data appear to be. Areas with clean, regular, through-going reflections exhibit a high degree of regularity, while noisy areas with disorganized reflections exhibit low regularity. Regularity is complementary to the chaos attribute, but its computation is more efficient due to using multidimensional Fourier transforms.

$$A_{regularity} = \frac{1}{NA_{max}^2} \sum_{k,l,m} (A_{max} - A(k, l, m))^2$$

For a window of white noise, all spectral components have strengths similar to the dominant one, all the terms vanish, and regularity is low. For a locally harmonic, perfectly planar reflector, one component dominates while the others vanish, all the terms approach unity, and regularity is high.

When used to measure how regular (or banded) the data are, often used window sizes are 11×11×11, 21×21×21, and 41×41×41 which characterize regularity at short, intermediate, and long scales. Highly irregular areas may correspond to salt or mass transport complexes. Employing a more columnar window, for example 3×3×11, 3×3×15, or 3×3×21, transforms the regularity attribute from a measure of bandedness to a measure of dip-steered (or structure-oriented) discontinuity which means that it detects edges or abrupt changes along the reflections. Such edges may be caused by faults or stratigraphic features with sharp boundaries, channels for example.

Another preferred attribute is interference $D_{inter}$ that sharpens up seismic reflection patterns while simultaneously increasing spatial coherency of reflectivity:

$$D_{inter} = \frac{1}{NA_{max}^2} \sum_{k,l,m} [A_{max} - D(k, l, m)][A_{max} - D(k, l, m)]^*$$

In this definition, the asterisk * denotes the complex conjugate as D is the complex spectrum. Interference is not so much a texture measure when applied directly, but rather an operator used during processing and preconditioning that transforms seismic textures to make them more pronounced. Measure attributes can be computed, however, from interference volumes. A preferred attribute based on interference is the instantaneous frequency computed from interference that separates simple waveforms from complex ones. First, the mean interference is subtracted. Second, the Hilbert transform of the mean-free interference is used to compute instantaneous interference phase defined as the angle between the Hilbert transform and the interference. Third, instantaneous interference frequency is compute by taking the derivative of locally unwrapped instantaneous interference phases. A less efficient version is simply taking the derivative of the interference volume.

Another attribute disclosed herein is the Laplacian $A_{laplace}$ measuring spectral curvature $$A_{laplace} = \frac{1}{N} \sum_{k,l,m} (6A(k, l, m) - A(k \pm 1, l, m) - A(k, l \pm 1, m) - A(k, l, m \pm 1))^2.$$

Another set of attributes is based on the spectral moments $$A^{pqr}_{rawmom} = \frac{1}{N} \sum_{k,l,m} k^p l^q m^r A(k, l, m)$$

$$A^{pqr}_{cenmom} = \frac{1}{N} \sum_{k,l,m} (k - \bar{k})^p (l - \bar{l})^q (m - \bar{m})^r A(k, l, m)$$

where $$\bar{k} = A^{100}_{rawmom} / A^{000}_{rawmom}$$

$$\bar{l} = A^{010}_{rawmom} / A^{000}_{rawmom}$$

$$\bar{m} = A^{001}_{rawmom} / A^{000}_{rawmom}$$

that can be computed both in a raw and central manner. Linear combinations of these moments allow computation of rotation, translation, and scale invariant moments.

By analogy, a similar set of attributes can be obtained from the phase spectrum $\theta$.

Another set of attributes is based on combinations of amplitude spectrum A and orientation ($\hat{k},\hat{l},\hat{m}$) or ($\phi,\theta$) where $\phi$ denote the azimuth and $\theta$ denotes the dip.

$$\phi = \arctan \hat{l}/\hat{k}$$

$$\phi = \arcsin \hat{m}$$

First, the attributes $\phi_{max}$, $\theta_{max}$ and $\kappa_{max}$ denote the azimuth, dip and wave number $\kappa = \sqrt{k*k+l*l+m*m}$ associated with the maximum $A_{max}$ the amplitude spectrum. Second, dimensionality of the spectra can be reduced by projection onto lower-dimensional surfaces. One particular kind of dimensionality reduction is by rebinning the spectra based on the orientation. Rebinning onto a unit sphere is more involved than might be expected because the bin sizes should be approximately equal. Simple-minded binning onto the unit sphere yields infinitesimal bins at the poles. Regular, or at least semi-regular, polyhedric bins can be more complicated than necessary. Preferably, a cylindrical domain is used for rebinning, where the bins are defined by division of $\theta$ and $\hat{z}$ into $N_\phi$ and $N_z$ segments. An arbitrary wave vector ($\phi,\hat{z}$) belongs to bin (i,j) for $$i \frac{2\pi}{N_\phi} \leq \phi < (i+1) \frac{2\pi}{N_\phi}$$

$$j \frac{2}{N_z} \leq \hat{z} + 1 < (j+1) \frac{2}{N_z}$$

The reduced spectrum R(i,j) is obtained by summing all appropriate contributions of A(k,l,m). Attributes are computed analogous to the ones previously defined for the full spectrum. Examples are $R_{max}$, or $R_{mean}$ and $R_{laplace}$:

$$R_{mean} = \frac{1}{N_z N_\phi} \sum_{i,j} R(i, j)$$

$$R_{laplace} = \frac{1}{N_z N_\phi} \sum_{i,j} (4R(i, j) - R(i \pm 1, j) - R(i, j \pm 1))^2$$

Carefully taking the periodic nature of the azimuth into account, spectral moments can again be computed.

$$R^{pq}_{rawmom} = \frac{1}{N_z N_\phi} \sum_{i,j} i^p j^q R(i, j)$$

$$R^{pqr}_{cenmom} = \frac{1}{N_z N_\phi} \sum_{i,j} (i - \bar{i})^p (j - \bar{j})^q R(i, j)$$

where $$\bar{i} = R^{10}_{rawmom} / R^{00}_{rawmom}$$

$$\bar{j} = R^{01}_{rawmom} / R^{00}_{rawmom}$$

Linear combinations of these moments allow computation of rotation, translation, and scale invariant moments.

Another way of reducing the spectrum is by computation of marginal distributions by integration or summation along one or multiple of the k, l, or m indices. Marginal distributions can also be computed in a spherical sense where the spectrum is integrated (or summed) along one or multiple of the $\phi$, $\theta$ and $\kappa$ directions. Attributes can then be computed from lower dimensional marginal distributions in analogy to the ones previously defined for the full spectrum.

Third, the spectra can be converted to a covariance matrix that allows computation of dominant directions.

$$C = \sum A^2(k, l, m) \begin{pmatrix} \hat{k} \\ \hat{l} \\ \hat{m} \end{pmatrix} (\hat{k}, \hat{l}, \hat{m})$$

Performing a singular value decomposition on C yields three eigenvalues ($\lambda_1 \geq \lambda_2 \geq \lambda_3$) and three eigenvectors ($v_1, v_2, v_3$). The eigenvalues allow estimation of the spectral shape or structure attributes.

TABLE 1

Structure associated with the eigenvalues.

| $\lambda_1$ | $\lambda_2$ | $\lambda_3$ | Structure |
|---|---|---|---|
| 0 | 0 | 0 | volume |
| + | 0 | 0 | surface |
| + | + | 0 | line |
| + | + | + | point |

The set of eigenvalue-based attributes includes dimensionality $C_{dim}$, plateness $C_{plate}$, pointness $C_{point}$, the Frobenius norm $C_{frob}$, or vesselness $C_{vess}$:

$$C_{dim} = 3\left(1 - \sqrt[3]{\frac{\lambda_2 \lambda_3}{\lambda_1^2}}\right)$$

$$C_{plate} = 1 - \frac{\lambda_2}{\lambda_1}$$

$$C_{point} = \frac{\lambda_3}{\sqrt{\lambda_1 \lambda_2}}$$

$$C_{frob} = \sqrt{\lambda_1^2 + \lambda_2^2 + \lambda_3^2}$$

$$C_{vess} = \left(1 - \exp\left(-\frac{\lambda_2^2}{2\alpha^2 \lambda_1^2}\right)\right) \exp\left(-\frac{\lambda_3^2}{2\beta^2 \lambda_1 \lambda_2}\right) \left(1 - \exp\left(-\frac{\lambda_1^2 + \lambda_2^2 + \lambda_3^2}{2\gamma^2}\right)\right)$$

The parameters $\alpha$, $\beta$, and $\gamma$ are tuning parameters that may be chosen to be, for example, ½, ½, and ¼.

An alternative, preferred embodiment of dimensionality is comparison of the second and third eigenvalue to the first and largest one.

$$C_{intdim} = \begin{cases} 3 & \text{for } \lambda_2/\lambda_1 > \varepsilon \text{ and } \lambda_3/\lambda_1 > \varepsilon \\ 2 & \text{for } \lambda_2/\lambda_1 \leq \varepsilon \text{ and } \lambda_3/\lambda_1 \leq \varepsilon \\ 1 & \text{for } \lambda_2/\lambda_1 > \varepsilon \text{ and } \lambda_3/\lambda_1 \leq \varepsilon \end{cases}$$

The threshold parameters is selected within the range $0 \leq \varepsilon \leq 1$. In practice, a value of about 0.7 has been found to generally produce good results.

It may be advantageous to scale any measure or attribute in a linear or nonlinear manner to increase resolving power and differentiation of textures. Such scaling may be performed in a model-driven sense where the measures are inverted, squared, combined, or used as arguments of generic functions. Scaling may also be performed in a data driven sense, for example by scaling to a user-defined range. A particular way of data-driven scaling is by histogram equalization which forms a more uniform histogram for any measure. Histogram equalization accomplishes this by effectively spreading out the most frequent values while compressing less frequent ones. A generalization of histogram equalization is histogram transformation where attribute histogram is stretched and squeezed to resemble a desired target histogram that is, for example, specified by the user. The regularity attribute $A_{regularity}$, for example, tends to create a histogram that resembles a log-normal distribution. To improve resolution, the tail is squeezed while the peak is stretched out.

Finally, the computed attributes 29 are stored in memory or on some storage medium for further usage. The workflow may terminate at this point without performance of Stage B (Classification) when the multidimensional spectral attributes are used for seismic interpretation, segmentation, or visualization. The regularity attribute $A_{regularity}$, for example, measures how organized seismic reflections are. Regions with clean, through-going reflections exhibit a high-degree of regularity, while noisy areas with disorganized reflections exhibit low regularity. Examples of such low-regularity regions are salt domes or mass transport complexes ("MTC") that can be distinguished from other parts of the data based on their low regularity. Attributes such as regularity can also be used to augment or control transparency and/or the color scheme during visualization.

Stage B (step 14 of FIG. 1) is classification in a broad sense where one or multiple multidimensional spectral attributes are used to label voxels. Some embodiments of the inventive method augment the set of multidimensional spectral attributes with additional generic attributes such as loop asymmetry, loop duration, or energy halftime.

Classification can be performed by various techniques including thresholding or binning; clustering or unsupervised classification; matching or supervised classification; or mining where features are allowed to belong to multiple classes.

A first classification technique is performed by thresholding, binning, or seed detection. Thresholding labels features based on one or multiple inventive attributes exceeding and/or undercutting threshold values, which in effect assigns a binary label. A generalization of thresholding is binning where multiple thresholds are used to assign each feature to one bin. Seed detection combines thresholding or binning with a spatial-connectivity criterion that allows label assignment only to voxels that are spatially connected to specified voxels.

A second classification technique is unsupervised classification, performed for example by using a clustering algorithm. Clustering is the assignment of voxels into groups (or clusters) so that voxel from the same cluster are more similar to each other than voxels belonging to different clusters. Similarity between voxels or clusters of voxels is established by comparison of feature vectors based on one or more inventive attributes, optionally augmented with one or more traditional attributes. Often similarity is assessed according to a distance measure that determines how the similarity of two voxels, or their feature vectors, is calculated. The choice of the similarity measure influences the shape of the clusters, as some elements may be close to one another according to one distance and farther away according to another. The particular choice of the measure, however, is not important for the inventive method. Two fundamental clustering strategies are partitional and agglomeral. Partitional clustering starts with one cluster and recursively breaks it up into a hierarchy of clusters. Agglomeral clustering starts with each voxel being its own cluster, and recursively combines smaller clusters into larger ones. The ultimate number of clusters is either prescribed by the interpreter or an algorithm, or estimated from the convergence of the progressive clustering. Another popular method of unsupervised classification uses a neural network to first discover distinct clusters and then to assign each voxel to one of these clusters.

A third classification technique is supervised classification where each voxel is assigned to one class based on its similarities to the different prescribed model classes (or models). The user or an algorithm selects some models characterized by distinct styles of reflectivity or seismic texture. For each seismic texture, a feature vector is established. These feature vectors are based on one or multiple inventive attributes, optionally augmented with one or more traditional attributes. Each voxel can now be compared to these model vectors to find the most similar one, and thus, to determine a class for each voxel. The actual comparison can be performed by linear or nonlinear projection, neural network, Bayesian networks, or boosting. The particular choice of the classifier is not important for the inventive method.

The fourth classification technique is data mining, defined herein to be a generalization of unsupervised clustering or supervised classification where each voxel can belong to more than one cluster or class. The ultimate result is either a set of likelihoods for each voxel to belong to the respective clusters or classes; or indicators stating whether a particular voxel could belong to the respective clusters/classes or not. One particular method to obtain indicators and corresponding indicator volumes is by thresholding the likelihoods.

The inventive method may terminate after Stage B with storing classification volumes in memory or on a storage medium for further analysis or visualization as these volumes can be used as attribute volumes.

Stage C takes the classification volumes, partitions (segments) them into regions based on the classifications, analyzes the volumes for their hydrocarbon potential, and creates a ranked list of targets based on their hydrocarbon potential, or presence or quality of at least some elements of a hydrocarbon system, for example, source, maturation, migration, reservoir, seal, or trap.

Classification can create disconnected groups of voxels with the same label. Seed detection or connected component labeling can be employed to separate and label disconnected groups of one or multiple classes, and thus to create different segments or regions.

Analysis and high-grading is discussed in another patent application entitled Seismic Horizon Skeletonization (U.S. Provisional Application Ser. No. 61/128,547), which discussion is summarized next.

Analysis of the regions includes defining or selecting one or more measures that will be used in the next step to rank or high-grade the regions. The measure may be any combination of the region geometries, properties of collocated (secondary) data, and relations between the regions. Geometric measures for regions refer to location, time or depth, size, length, area, cross section, volume, orientation, or shape. These measures also may include an inertia tensor; raw, central, scale- and rotation-invariant moments; or covariance. Some measures, for example curvature, are local measurements in the sense that every point on region boundary will have its own local value. In order to obtain one value characterizing the region, one needs to integrate or sample the local ones, for example by selecting its mean, median, or one of the extrema. Moreover, curvature is actually not a scalar quantity but a tensoral one, which allows definition of a range of local curvature measures such as the minimum, maximum, mean, most-positive, most-negative, or Gaussian curvature.

Collocated property measures are built by querying a dataset at the locations occupied by the region. For example, one can extract the values from a collocated seismic or attribute dataset such as amplitude or a collocated geologic model such as porosity or environment of deposition, and compute a statistical measure for these values. Statistical measures include average, median, mode, extrema, or variance; or raw, central, scale- and rotation-invariant property-weighted moments. If two collocated properties are extracted, then a measure can be computed by correlation of the collocated values, for example porosity and hydraulic permeability extracted from collocated geologic models.

Another family of analysis and measurements examines relations between regions. Measures include the distance or similarity to neighboring regions; the distance to the nearest region of the same classification, the total number of neighboring regions, or the number of neighboring regions above or below a given region.

One specific alternative for the analysis of the regions is the calculation and use of direct hydrocarbon indicators ("DHIs") to high-grade a previously generated set of regions. An example of such a DHI is amplitude fit to structure. In a hydrocarbon reservoir, the effect of gravity on the density differences between fluid types generates a fluid contact that is generally flat. Because the strength of a reflection from the top of a hydrocarbon reservoir depends on the fluid in that reservoir, reflection strength changes when crossing a fluid contact. Correlating the voxel depths with seismic attributes such as collocated amplitude strength facilitates rapid screening of all regions in a volume for evidence of fluid contacts, and thus, the presence of hydrocarbons.

Other examples of seismic DHI-based measures for the analysis of regions or their surfaces include amplitude anomalies, amplitude versus offset (AVO) effects, phase changes or polarity reversals, and fluid contacts or common termination levels. Other geophysical hydrocarbon evidence includes seismic velocity sags, and frequency attenuation; also, electrical resistivity. Amplitude anomaly refers to amplitude strength relative to the surrounding background amplitudes as well as their consistency and persistence in one amplitude volume, for example, the full stack. A bright amplitude anomaly has amplitude magnitudes larger than the background, while a dim anomaly has amplitude magnitudes smaller than the background. Comparison of seismic amplitudes at the surface or region location against an estimated background trend allows highgrading based on the anomalous amplitude strength DHI measure Comparing collocated amplitudes between different volumes, for example near-, mid-, and far-offset stacks allows assignment of an AVO class. An AVO Class 1 has a clearly discernable positive reflection amplitude on the near-stack data with decreasing amplitude magnitudes on the mid- and far stack data, respectively. An AVO Class 2 has nearly vanishing amplitude on the near-stack data, and either a decreasing positive amplitude with offset or progressively increasing negative amplitude values on the mid- and far-stack data. An AVO class 3 exhibits strong negative amplitudes on the near-stack data growing progressively more negative with increasing offset. An AVO Class 4 exhibits very strong, nearly constant negative amplitudes at all offsets. Preferably, amplitude persistence or consistency within an region is used as a secondary measure within each of the AVO classes. Comparison of partial offset- or angle-stacks at the location of surfaces or regions allows classification by AVO behavior, and thus, highgrading based on the AVO DHI measure. An alternative to partial stacks is the estimation of the AVO parameters A (intercept) and B (gradient) from prestack (offset) gathers at the locations of the regions, and use of these parameters for AVO classification or computation of a measure such as A*B or A+B.

Evidence of fluid contact is yet another hydrocarbon indicator. A fluid contact can generate a relatively flat reflection, and thus a relatively flat surface. Measuring the flatness of each surface allows the highlighting of fluid contacts. The preferred embodiment of a flatness measure corrects the individual measures with a regional trend, which allows correction for variable water depth and other vertical distortions caused by the overburden. A fluid contact implies a fluid change for example from hydrocarbon gas to water. Sometimes, the boundary between reservoir seal and water-filled reservoir is a seismic surface with positive polarity, while the boundary between seal and gas-filled reservoir is a surface with negative polarity. In such situations, the seal-reservoir boundary corresponds to a surface exhibiting a polarity change from shallow to deep across the fluid contact. Comparison of the wavelet polarity or estimation of the instantaneous wavelet phase along the surface or region allows identification of regions exhibiting a polarity-reversal or phase-change DHI.

An abrupt down dip termination of many nearby regions or surfaces or a locally persistent abrupt change of amplitudes are yet more examples of direct hydrocarbon indicators that can be quantified from regions or their surfaces. The termination depths of adjacent surfaces or regions are compared or correlated, or preferentially, the number of similar termination depths in the same region are counted to allow identification of regions exhibiting an abrupt down-dip termination DHI measure.

Locally abrupt change of amplitude can be measured by performance of an edge-detection operation on the amplitudes at the locations of the surfaces or regions and correlation of such edges between nearby surfaces or regions. An alternative to edge detection is correlation of seismic dissimilarity or discontinuity between nearby surfaces or regions.

Using data other than seismic amplitudes enables other measures of direct hydrocarbon indicators. Hydrocarbon gas tends to increase the attenuation of seismic energy, and thus, to lower the frequency content of the seismic signal when compared to the surrounding background. Frequency shifts can be measured and quantified from instantaneous frequency volumes or by comparison of spectrally decomposed volumes. Observation of consistent frequency shifts at the location of the surfaces or regions allows high-grading based on the frequency-shift DHI measure.

Hydrocarbon gas also tends to decrease the speed of seismic waves, which leads to locally sagging surfaces in time domain data. Computing for example the sum of the second derivatives (i.e., the Laplace operator) of the surfaces allows measurement of the sagginess. In severe cases, the gas is even detectable on volumes of seismic velocity obtained by inversion, tomography, or velocity analysis; with velocities at the locations of surfaces regions being lower than the regional trend.

In preferred methods for direct detection of hydrocarbons in regions or their surfaces, analysis and measurement also includes confidence as a function of data quality, data quantity, prior expectations, and if available, ground truth, for example from calibrated wells.

Elements of the hydrocarbon system include reservoir, seal, and source. An example measure for reservoir or seal quality is deformation, expressed for example by layer developability (J. L. Fernández-Martínez and R. J. Lisle, "GenLab: A MATLAB-based program for structural analysis of folds mapped by GPS or seismic methods," *Computers &Geosciences* 35, 317-326 (2009)). Deviation from a developable geometry implies that bed stretching during folding has occurred. The model is therefore linked with straining of the horizon and can be used for highlighting regions of deformation expressed by brittle fracturing or ductile deformation. Brittle deformation implies the potential of fracture-enhanced porosity increasing the storage capacity in a reservoir compartment, but also disrupting a sealing unit. Ductile deformation implies shale-rich strata which are poor reservoirs, but constitute source rocks and serve as seals. Another deformation measure is surface curvature. Deformed regions tend to have surfaces with higher values of curvature indicating the potential for enhanced fracturing which provides additional porosity and the potential for increased storage of hydrocarbons, but also damages seals with the increased risk of trap failure.

Having one or more measures, for example the disclosed DHI measures, for each region allows high-grading of the relevant ones. Selection criteria include thresholding, ranking, prioritizing, classification, or matching. A first approach might be to apply a threshold to the measures and select all regions either exceeding or undercutting the threshold. Another high-grading method is ranking the regions in accordance to their measures, and then selecting the top ranked regions, the top ten regions for example. A special case of ranking is prioritizing, where all regions are selected but associated with their rank, for example through their label or a database. Subsequent analyses commence with the highest-ranked region and then go through the regions in accordance to their priorities until a prescribed number of acceptable regions are identified, or until time and/or resource constraints require termination of further activities.

EXAMPLE

The example is a seismic volume with dimensions of 1000×300×100 voxels. All FIGS. 3-12 show only one slice through the volume centers, but all operations are performed on three-dimensional brick-shaped volumes.

Figure 3:
FIG. 3 shows a slice through a seismic amplitude data volume used to calculate the multidimensional attributes of the present invention that are shown in similar data volume slices in FIGS. 4-9.
Figure 4:
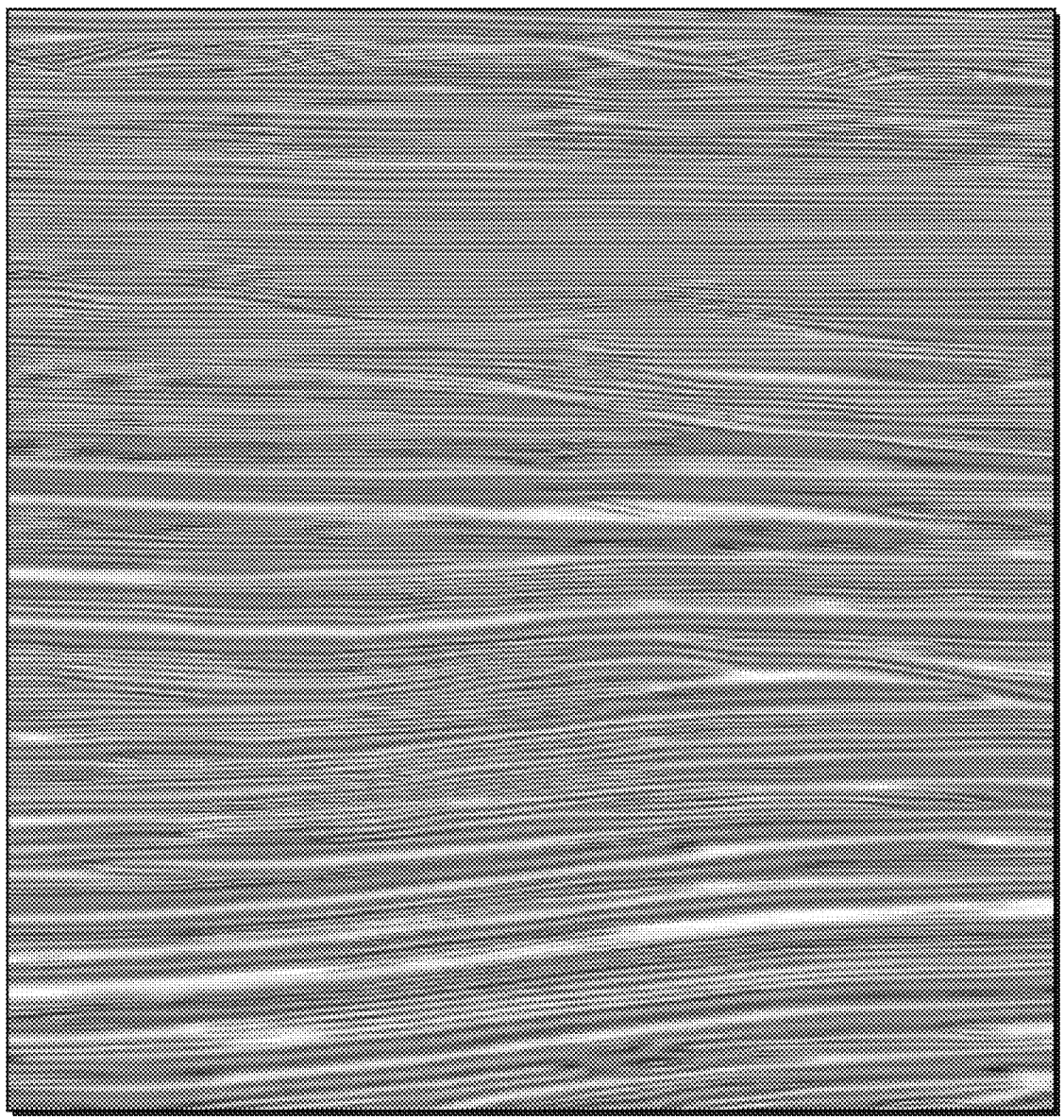
FIG. 4 shows a slice of the Interference attribute $D_{inter}$ computed from the amplitude data.
Figure 5:
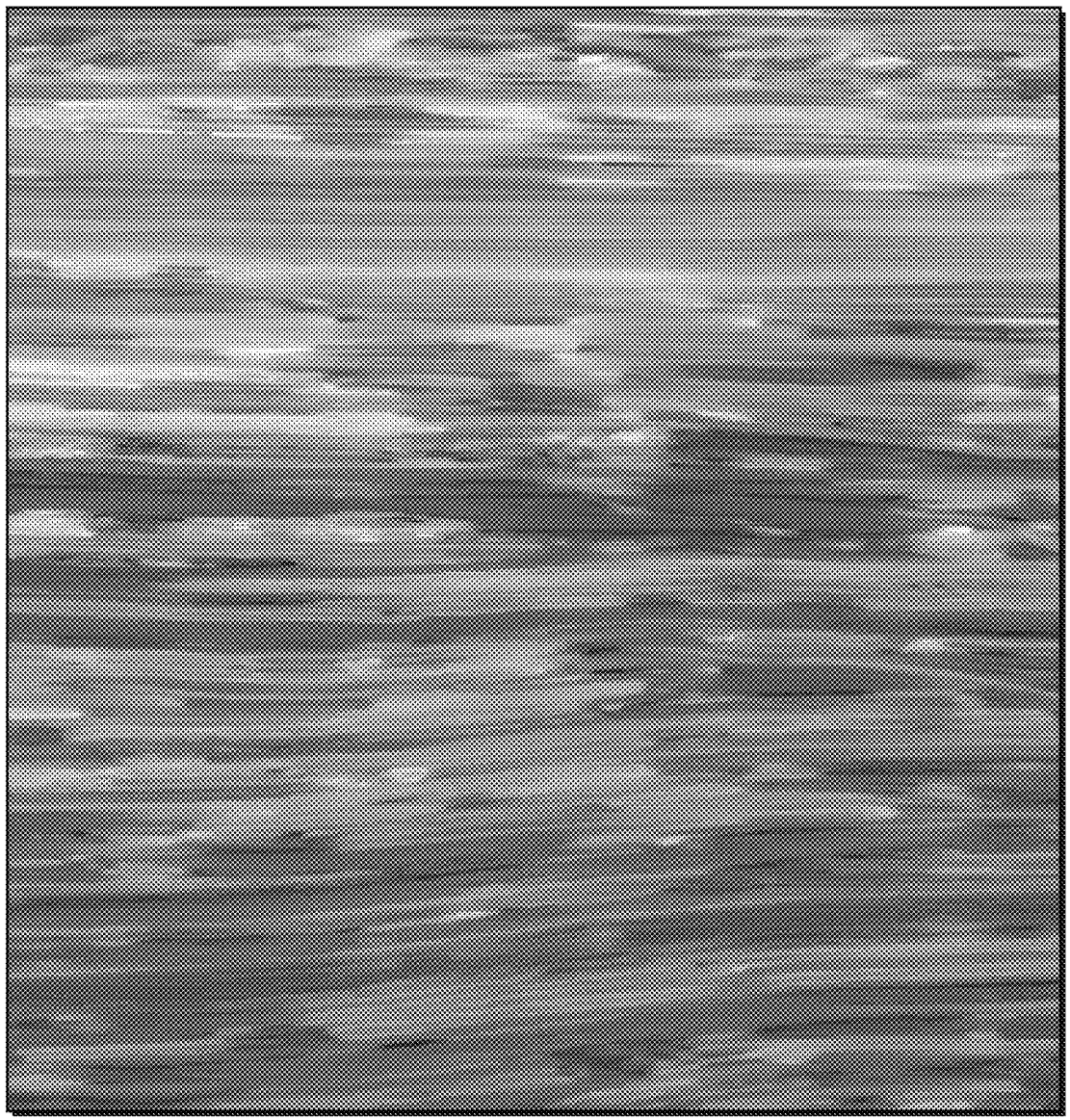
FIG. 5 presents a slice of Instantaneous Interference Frequency volume.

FIG. 3 displays a cross section through the original seismic amplitude volume used in this example. For performing the Stage A steps in the flow chart of FIG. 2, the window is chosen to be of size 21×21×21. For every voxel of the data, a neighborhood of size 21×21×21 centered at the current voxel is extracted from the volume. This window is first tapered with a cosine filter to reduce edge truncation artifacts and then transformed to the three-dimensional Fourier domain using a three-dimensional discrete Fourier transformation (DFT). From the resulting spectra, the interference attribute $D_{inter}$ and its instantaneous frequency are computed and are shown in FIGS. 4 and 5, respectively. Comparison of the original data (FIG. 3) and the interference attribute $D_{inter}$ (FIG. 4) demonstrates the ability to transform seismic texture. The attribute appears to have higher resolution and greater continuity of reflection events. Some areas become finely layered, while others exhibit bright and broad events. The attributes allows visual segmentation into regions, but additional measures are required for computational segmentation. The distinction between finely layered regions and broad reflections is captured by the instantaneous frequency of interference (FIG. 5). Broad events map onto low frequencies, while fine layers map onto higher ones. (In the figures showing slices of a seismic or attribute data volume, magnitude increases from darker to brighter shades of gray.)

Figure 6:
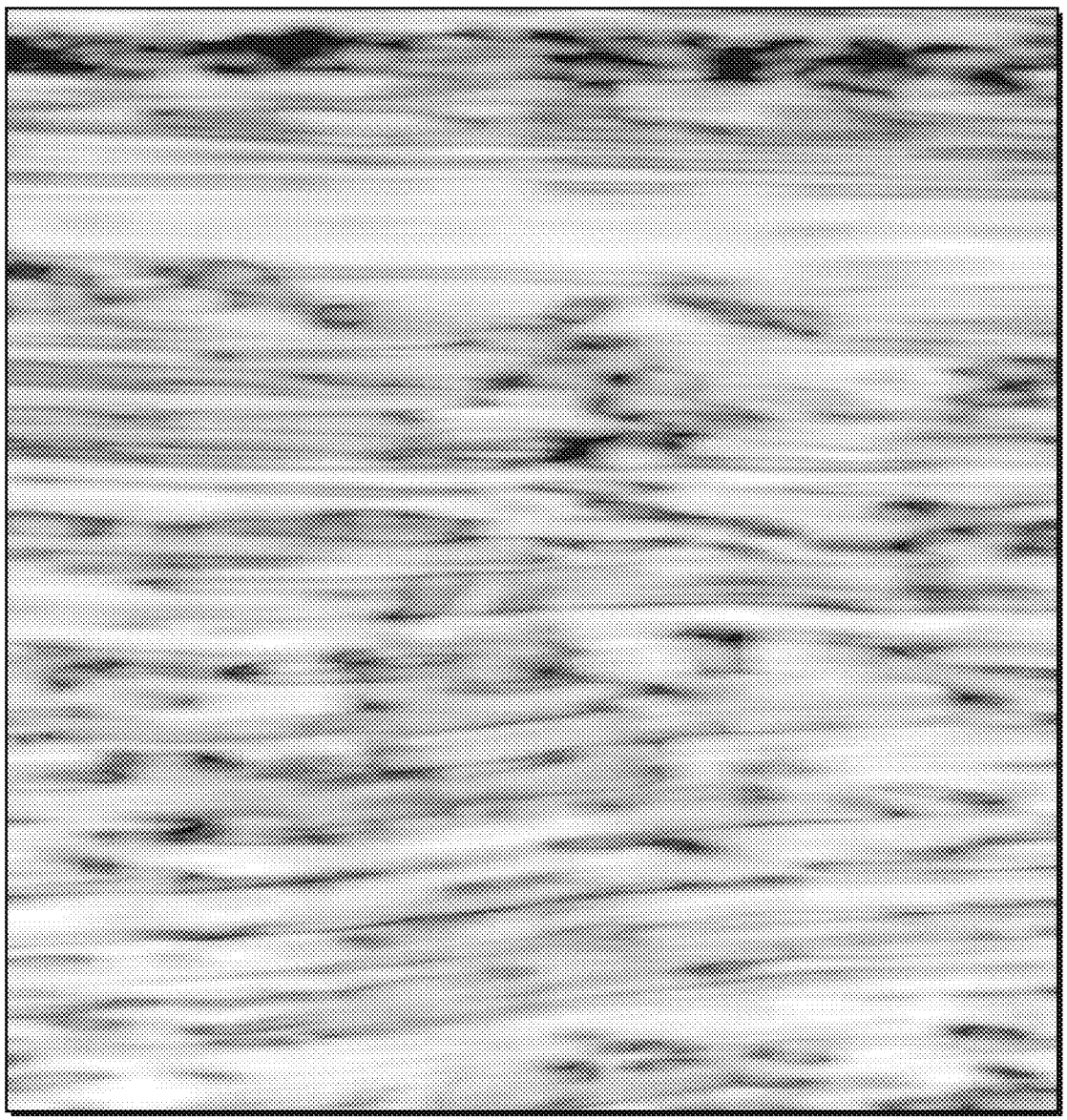
FIG. 6 shows a slice through the Regularity volume $A_{regularity}$.

FIG. 6 presents another preferred window-based multidimensional Fourier attribute, Regularity $A_{regularity}$, that measures how banded (or regular) seismic data appear to be. Areas with clean, through-going reflections (often termed railroad tracks) exhibit a high degree of regularity, while noisy areas with disorganized reflections exhibit low regularity.

Figure 7:
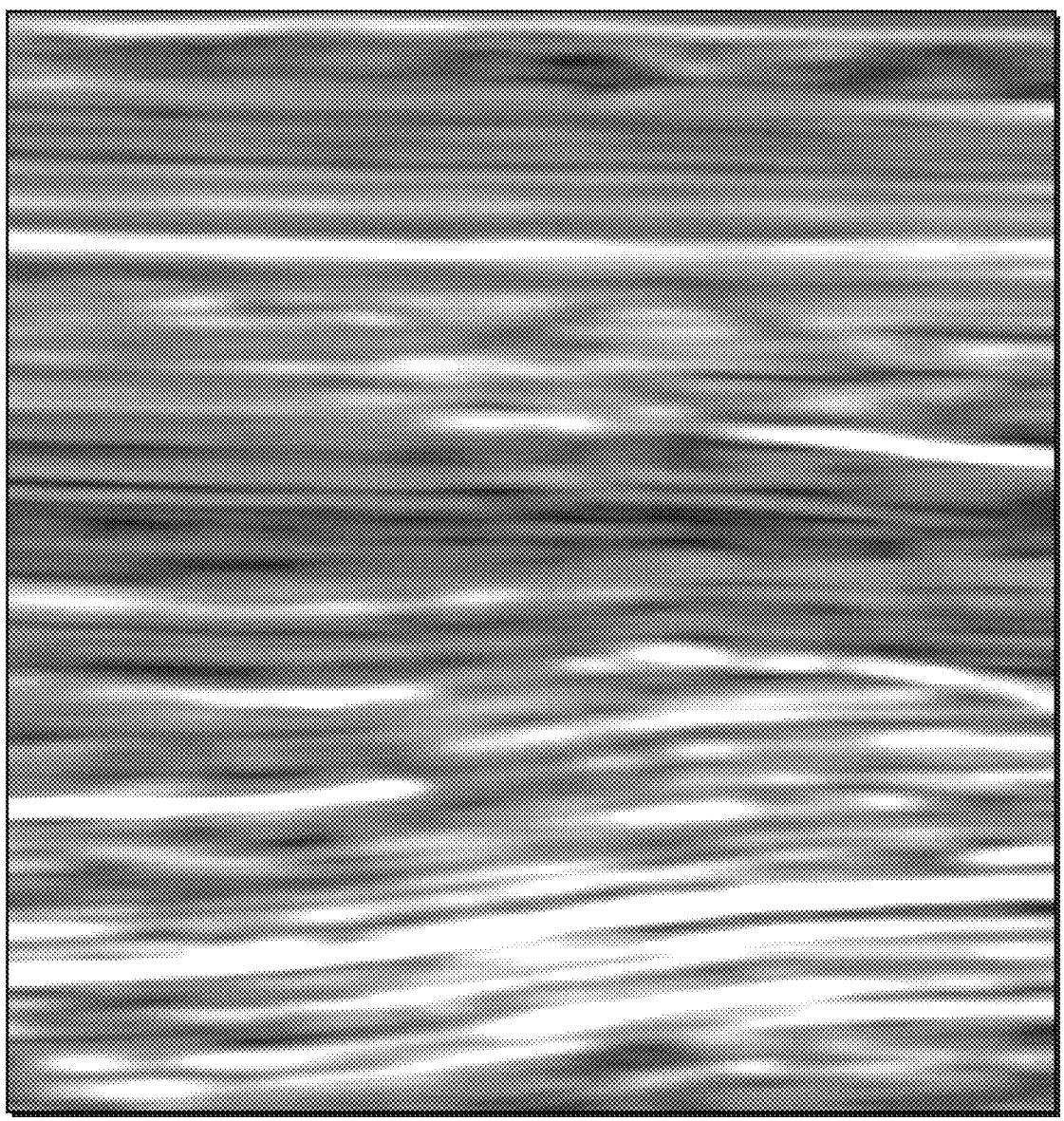
FIG. 7 presents a slice of the Harmonic Mean attribute $A_{harmonic}$.
Figure 8:
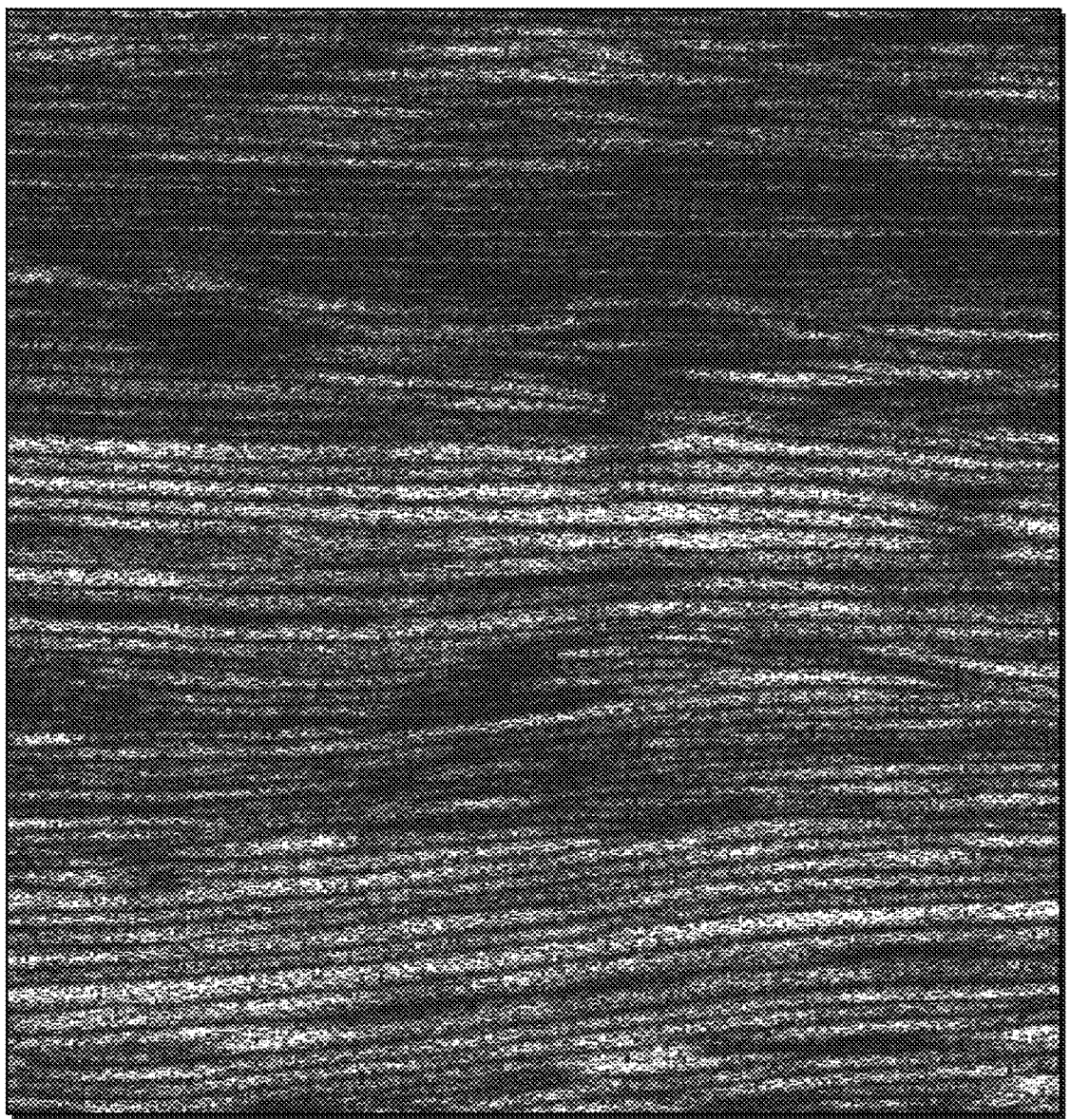
FIG. 8 shows a slice of the Minmax volume $A_{minmax}$.
Figure 9:
FIG. 9 shows a slice through a Plateness cube $C_{plate}$.

Other window-based multidimensional Fourier attributes are shown in FIG. 7 (Harmonic Mean $A_{harmonic}$), FIG. 8 (Minmax $A_{minmax}$), and FIG. 9 (Plateness $C_{plate}$). Minmax $A_{minmax}$ is relatively noisy because small amounts of noise have strong effects on the spectral extrema ratio. In practice, this attribute would be post-processed with a median filter to reduce the speckles, but in this example, the raw attribute is presented.

Figure 10:
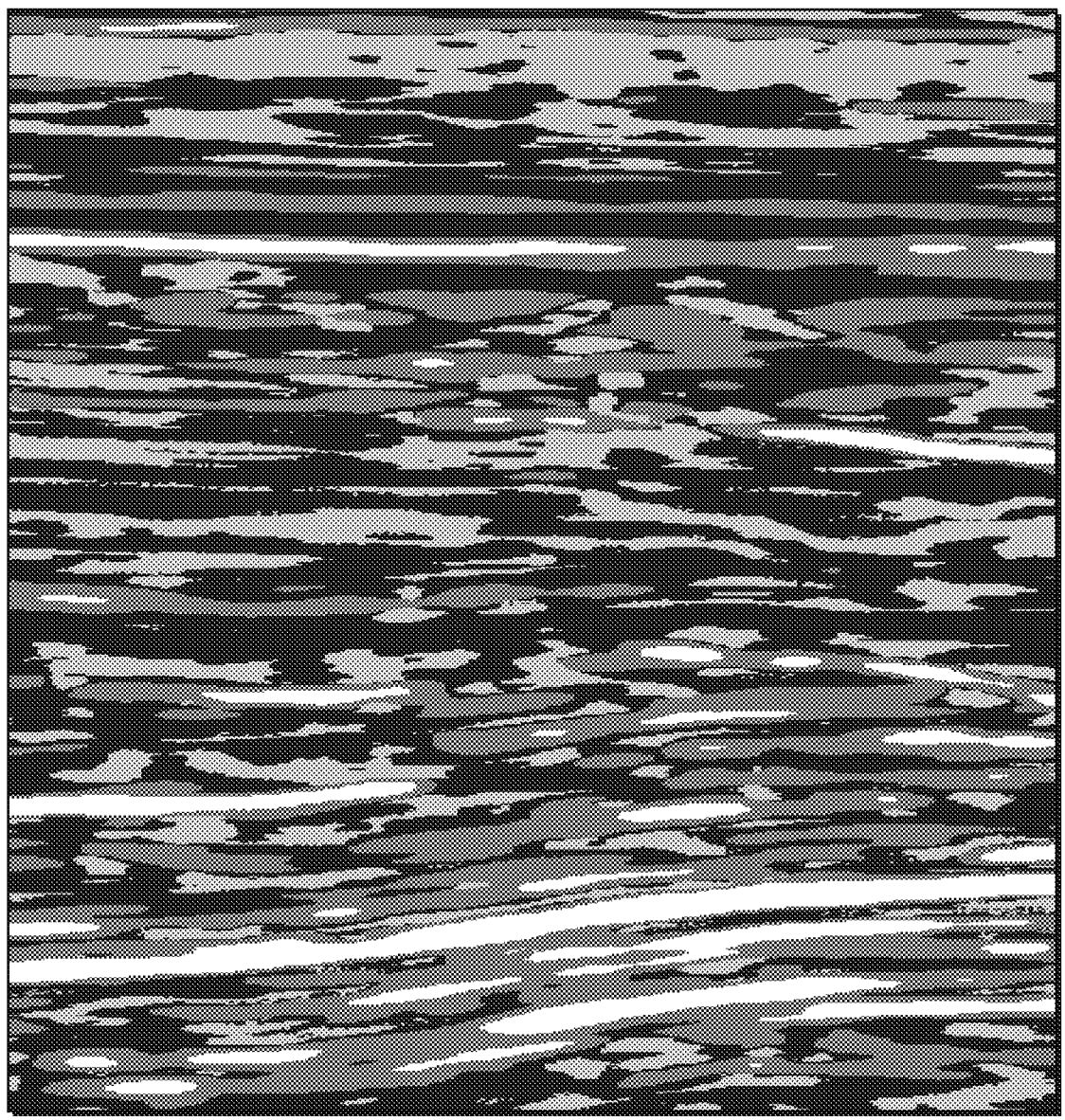
FIG. 10 shows a slice of a classification volume based on unsupervised segmentation into four classes based on Regularity (FIG. 6), Harmonic Mean (FIG. 7), Minmax (FIG. 8), and Plateness (FIG. 9)
Figure 11:
FIG. 11 shows disconnected regions obtained by identification of connected voxels belonging to the fourth class (FIG. 10)

During Stage B in this particular example, the voxels are grouped into four classes based on Regularity $A_{regularity}$, Harmonic Mean $A_{harmonic}$, Minmax $A_{minmax}$, and Plateness $C_{plate}$. Unsupervised classification is performed using a standard κ-means clustering algorithm which aims to partition all voxels into, e.g., four clusters in which each voxel belongs to the cluster with the nearest mean. This algorithm starts by partitioning the voxels at random into, e.g., four initial sets. It then calculates the mean point, or centroid, of each set using the attributes as coordinates. It constructs a new partition by associating each point with the closest centroid. Then the centroids are recalculated for the new clusters, and the algorithm is repeated by alternate application of these two steps until it converges. FIG. 10 presents a slice through the resulting classification cube, where the four different classifications are indicated by black, two shades of gray, and white.

Figure 12:
FIG. 12 shows the regions belonging to the fourth class (FIG. 11) prioritized based on their average Instantaneous Interference Frequency (FIG. 5) content.

In Stage C, voxels identified to belong to the fourth class (white) are first isolated and then combined into regions or segments using a connected component labeling algorithm. The result is 43 disconnected regions consisting of class-4 voxels shown in FIG. 11, with all other voxels now being shown as black. As a demonstration of high-grading or prioritizing (step 17), the voxels of each region are analyzed (step 16) by computation of the instantaneous frequency interference attribute. Since this attribute was already stored in memory (FIG. 5), it was not computed again but instead simply suppressed for voxels belonging to another class. Continuing Stage C, a measure is computed for each region by averaging its values of instantaneous frequency interference, and this measure is then used to prioritize the regions by ranking the regions in order of decreasing average instantaneous frequency interference. Thus, regions with large measures, or high average instantaneous frequency interference, are ranked high and have priority over other regions. FIG. 12 attempts to show this ranking via shades of gray, with lighter shades indicating higher priority.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will also readily recognize that in preferred embodiments of the invention, at least some of the steps in the present inventive method are performed on a computer, i.e. the invention is computer implemented.

The invention claimed is:

1. A computer-implemented method for transforming a seismic survey data volume into a seismic attribute data volume more sensitive to subsurface geophysical features indicative of hydrocarbon potential, comprising:
   (a) selecting a 2D or 3D data analysis window size;
   (b) for each of multiple positions of the analysis window in the seismic survey data volume, using a computer to transform the seismic data within the window to a spectrum in a two or three dimensional wavenumber domain;
   (c) defining an attribute of the seismic data based on one or more spectral properties, herein called spectral attribute, and using a computer to compute the spectral attribute for each window, and assigning that attribute value to a spatial location representative of the window, thereby creating a multidimensional spectral attribute data volume;
   (d) using the multidimensional spectral attribute data volume to predict hydrocarbon potential of a subsurface region;
   (e) using the prediction of hydrocarbon potential in deciding whether to drill a well into the subsurface region; and
   (f) in the event of a positive decision in (e), drilling the well into the subsurface region.

2. The method of claim 1, wherein the defined spectral attribute is defined in terms of a selected measure of at least two data values within the analysis window after the transforming of the data within the window.

3. The method of claim 2, further comprising:
   classifying cells in the seismic survey data volume based on value of the computed attribute at that cell location;
   partitioning the cells into regions based on the classification; and
   interpreting one or more regions to correspond to subsurface geophysical features.

4. The method of claim 3, further comprising repeating step (c) to define and compute a second multidimensional spectral attribute and create a data volume of its values, then using the second multidimensional spectral attribute to prioritize regions with the same classification, and using one or more of those regions based on the prioritization to interpret a correspondence to subsurface geophysical features.

5. The method of claim 2, wherein the defined spectral attribute is one of a group of attributes of the transformed seismic data amplitude spectrum, said group consisting of mean, harmonic mean, median, mode, variance, standard deviation, skewness, kurtosis, eccentricity, and anisotropy defined as the ratio between maximum and mean.

6. The method of claim 2, wherein the defined spectral attribute is one of a group consisting of regularity, interference, and Laplacian.

7. The method of claim 2, wherein the defined spectral attribute is based on a spectral moment or a linear combination of spectral moments of the transformed seismic data amplitudes or of the transformed seismic data phase spectrum.

8. The method of claim 2, wherein the defined spectral attribute is based on a combination of the transformed seismic data amplitude spectrum and orientation.

9. The method of claim 2, wherein the defined spectral attribute is based on azimuth, dip or wave number associated with a maximum in the transformed seismic data amplitude spectrum.

10. The method of claim 8, wherein dimensionality of the windowed spectra is reduced by projection on to a lower-dimensional surface.

11. The method of claim 10, wherein the dimensionality reduction is accomplished by rebinning the windowed spectra based on orientation.

12. The method of claim 8, wherein the windowed spectra are converted to a covariance matrix, which is used to compute dominant directions.

13. The method of claim 12, wherein the dominant directions are computed by singular value decomposition, and the defined spectral attribute is based on resulting eigenvalues.

14. The method of claim 13, wherein the defined spectral attribute is one of a group consisting of a largest eigenvalue, and ratios of a second and third largest to the largest eigenvalue.

15. The method of claim 3, wherein classifying is performed by one method of a group consisting of: thresholding, binning, seed detection, clustering, other unsupervised classification, matching, supervised classification, or mining where features are allowed to belong to multiple classes.

16. The method of claim 2, wherein the seismic data are transformed to wavenumber domain using one of a group consisting of the Fourier, Bessel and Hankel transforms.

17. The method of claim 16, wherein the seismic data are transformed to wavenumber domain using a multidimensional Discrete Fourier Transform.

18. The method of claim 1, wherein the defined spectral attribute is one of a group of attributes of the transformed seismic data amplitude spectrum, said group consisting of maximum and minimum.

19. A method for exploring for hydrocarbons, comprising:
   (a) obtaining a data volume of seismic data resulting from a seismic survey;
   (b) transforming, using a computer, the seismic survey data volume into a multidimensional spectral attribute data volume using a method comprising:
      (i) selecting a 2D or 3D data analysis window size;
      (ii) for each of multiple positions of the analysis window in the seismic survey data volume, using a computer to transform the seismic data within the window to a spectrum in a two or three dimensional wavenumber domain;
      (iii) defining an attribute of the seismic data based on one or more spectral properties, herein called spectral attribute, and using a computer to compute the spectral attribute for each window, and assigning that attribute value to a spatial location representative of the window, thereby creating a multidimensional spectral attribute data volume;
   (c) using the multidimensional spectral attribute data volume to predict hydrocarbon potential of a subsurface region;
   (d) using the prediction of hydrocarbon potential in deciding whether to drill a well into the subsurface region; and (e) in the event of a positive decision in (d), drilling a well into the subsurface region.

\* \* \* \* \*